United States Patent [19]

Duncan

[11] Patent Number: 4,626,460

[45] Date of Patent: Dec. 2, 1986

[54] COEXTRUDED PRESSURE SENSITIVE LABEL STOCK MATERIAL WITH INTEGRAL PEELABLE BACKING

[75] Inventor: Gary L. Duncan, Fairport, N.Y.

[73] Assignee: Mobil Oil Corporation, New York, N.Y.

[21] Appl. No.: 814,693

[22] Filed: Dec. 30, 1985

Related U.S. Application Data

[63] Continuation-in-part of Ser. No. 753,850, Jul. 11, 1985, Pat. No. 4,582,736.

[51] Int. Cl.$^4$ .............................. A61F 3/02; B32B 3/26
[52] U.S. Cl. .................................... 428/40; 428/313.3; 428/315.5; 428/317.3; 428/317.9; 428/323; 428/352; 428/354; 428/910
[58] Field of Search .................... 428/40, 313.3, 313.5, 428/313.9, 314.4, 314.8, 315.5, 315.7, 315.9, 317.1, 317.3, 317.5, 317.7, 317.9, 323, 352, 354, 910

[56] References Cited

U.S. PATENT DOCUMENTS

| | | | |
|---|---|---|---|
| 3,262,827 | 7/1966 | Kallander et al. | 428/315.5 |
| 3,426,754 | 2/1969 | Bierenbaum et al. | 428/315.5 |
| 3,751,329 | 8/1973 | Fonzi et al. | 428/315.5 |
| 3,850,786 | 11/1974 | Jeffries et al. | 428/352 |
| 3,914,484 | 10/1975 | Creegan et al. | 428/42 |
| 3,963,851 | 6/1976 | Toyoda | 428/315.5 |
| 4,035,218 | 7/1977 | Yount | 156/289 |
| 4,049,847 | 9/1977 | Eisentraeger et al. | 427/208.4 |
| 4,339,485 | 7/1982 | Shibano et al. | 428/40 |
| 4,377,616 | 3/1983 | Ashcraft et al. | 428/315.7 |
| 4,425,176 | 1/1984 | Shibano et al. | 156/244.11 |
| 4,496,620 | 1/1985 | Park et al. | 428/910 |

*Primary Examiner*—William J. Van Balen
*Attorney, Agent, or Firm*—Alexander J. McKillop; Michael G. Gilman; Charles J. Speciale

[57] ABSTRACT

A biaxially oriented label stock product of which comprises:
  (a) a facing layer in the form of a polyolefin film having an upper surface and a lower surface, a pressure sensitive adhesive component incorporated within said facing layer or applied as a coating to the lower surface thereof; and,
  (b) a release layer in the form of a polyolefin film having an upper surface and a lower surface and having a release agent component for the pressure sensitive adhesive component of facing layer (a) incorporated therein or applied as a coating to the upper surface thereof, the lower surface of facing layer (a) being peelably affixed to the upper surface of said release layer (b).

20 Claims, No Drawings

COEXTRUDED PRESSURE SENSITIVE LABEL STOCK MATERIAL WITH INTEGRAL PEELABLE BACKING

CROSS REFERENCE TO RELATED APPLICATION

This application is a continuation-in-part of commonly assigned copending U.S. patent application Ser. No. 753,850 filed July 11, 1985 now U.S. Pat. No. 4,582,736.

BACKGROUND OF THE INVENTION

This invention relates to the field of pressure sensitive adhesive labels.

In the conventional manufacture of pressure sensitive adhesive labels, a solution of a pressure sensitive material is applied to a substrate, or face stock, usually paper, in the form of a continuous web and dried. Thereafter a release sheet, usually provided as a continuous paper web coated with a release agent, is applied to the exposed pressure sensitive adhesive surface to form a substrate-pressure sensitive adhesive-release sheet label stock which is then wound on a rewind roll for further processing such as sheeting, slitting or other converting. After that, the label stock is typically printed, cut and collated by a printer to form individual printed sheets. Such sheets may be utilized for any number of uses including name tags, stickers, labels, etc., by simply peeling away the release paper and pressing the adhesive-coated side of the face sheet to the desired surface.

SUMMARY OF THE INVENTION

It is an object of the present invention to manufacture a pressure sensitive label stock material entirely from synthetic resin components in a single coextrusion operation employing conventional equipment.

It is a further object of the invention to provide a biaxially oriented label stock product possessing a facing layer having a pressure sensitive adhesive material incorporated therein or applied to the surface thereof coextruded with, and peelably affixed to, a release layer having a release material incorporated therein or applied to the surface thereof adjacent the facing layer.

In keeping with the foregoing objects, there is provided a biaxially oriented label stock product which comprises:
  (a) a facing layer in the form of a polyolefin film having an upper surface and a lower surface, a pressure sensitive adhesive component incorporated within said facing layer or applied as a coating to the lower surface thereof; and,
  (b) a release layer in the form of a polyolefin film having an upper surface and a lower surface and having a release agent component for the pressure sensitive adhesive component of facing layer (a) incorporated therein or applied as a coating to the upper surface thereof, the lower surface of facing layer (a) being peelably affixed to the upper surface of said release layer (b).

In the simplest form, facing layer (a) which has been compounded with a pressure sensitive adhesive component is coextruded with release layer (b) which has been compounded with a release agent to provide an integral label stock product. Thus, the manufacturing operations involved in providing the pressure sensitive label stock material of this invention are relatively simple and few in number compared to the conventional manufacturing procedure described above.

DESCRIPTION OF THE PREFERRED EMBODIMENTS

The polyolefins contemplated as facing layer (a) and/or release layer (b) of the subject film structure include polyethylene, polypropylene, polybutene and copolymers and blends thereof. An isotactic polypropylene containing at least 80% by weight of isotactic polypropylene and having a melt flow index of from about 4 to 8 g/10 minutes is advantageously used for both layers.

Facing layer (a) can itself be a laminate of two or more thermoplastic films where particular effects are desired. One such laminate, the opaque biaxially oriented polymer film structure of U.S. Pat. No. 4,377,616, the contents of which are incorporated by reference herein, is especially preferred for facing layer (a) herein since it imparts a lustrous satin-like appearance to the finished product. In this embodiment, facing layer (a) is further characterized as, possessing:
  (i) a thermoplastic matrix substrate layer having an upper and lower surface, a pressure sensitive adhesive component incorporated within said substrate layer and a strata of voids located within said substrate layer;
  positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void; and,
  (ii) a void-free thermoplastic skin layer affixed to the upper surface of substrate layer (a) (i).

In order to achieve the lustrous satin appearance of the laminate constituting the preferred embodiment of facing layer (a) of the present invention, it is important that a particular thickness relationship exist between the thickness dimension of substrate layer (a)(i) and the thickness dimension of skin layer (a)(ii). It is preferred that the thickness be from about 30 to about 85% of the overall structure. This, in combination with the population and configuration of the voids in a structure of at least about 0.5 mils thick, will materially contribute to the overall degree of opacity of the structure. Likewise, by maintaining the thickness of skin layer (a)(ii) within a particular range in relation to the overall thickness of facing layer (a) and to the thickness of substrate layer (a)(i), the overall combination will exhibit a lustrous satin appearance. It is preferred that the thickness of skin layer (a)(ii) constitute from about 15 to about 70% of the total thickness of facing layer (a). It is important that skin layer (a)(ii) be sufficiently thick so that its outer surface will not manifest the rough texture or surface irregularities of underlying substrate layer (a)(i). If this were not the case, the lustrous satin-like appearance of skin layer (a) would be significantly lessened.

It is preferred that the average diameter of the void-initiating particles contained within substrate layer (a)(i) be from about 0.1 to about 10 microns. These particles should be approximately spherical in shape so as to initiate the formation of voids of unusual regularity and orientation in a stratified relationship throughout the matrix material following biaxial orientation of the entire coextruded product. This does not mean that every void must be the same in size. It means, generally speaking, that the voids will be of a similar shape even though they may vary in their dimensions because they are all initiated by a substantially spherical particle. Ideally, all of the voids possess a shape defined by two opposed and edge-contacting concave disks.

Optimum characteristics of opacity and satin-like appearance are obtained when the two average major void dimensions are greater than about 30 microns.

As indicated above, the void-initiating particle material should be incompatible i.e., immiscible, with the matrix polymer of substrate layer (a)(i) at least at the temperature of biaxial orientation.

Substrate layer (a)(i) has been described above as a thermoplastic polymer matrix material within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed, void-initiating particles may contribute little else to the substrate layer. This is because its refractive index can be close enough to that of the matrix material that it makes no contribution to opacity. When this is the case, opacity is principally a result of the light scattering effect brought about by the existence of the voids. The opacity of the substrate layer can be increased somewhat by incorporating an opacifying pigment therein. Titanium dioxide and zinc oxide are representative of such opacifying pigments. A particularly preferred proportion of pigment in substrate layer can be from about 1% to about 3% by weight of this layer. The particle size and shape of the pigment material is such that it does not bring about any significant amount of void formation. The optional presence of such an opacifying pigment contributes perhaps 3 to 8% to the degree of opacity of the system.

A typical void in substrate layer (a)(i) may be defined as having major dimensions X and Y and minor dimension Z where dimension X is aligned with the machine direction orientation, dimension Y is aligned with the transverse direction orientation and dimension X approximately corresponds to the cross-sectional dimension of the spherical particle which initiated the void. It is a necessary part of the present invention that orientation conditions be such that the X and Y dimensions of the voids present in the substrate layer be major dimensions in comparison to the Z dimension. Thus, while the Z dimension generally approximates the cross-sectional dimension of the spherical particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of their dimensions. The voids are particularly vulnerable to destruction during sequential orientation if the stretching temperature is too low. Even in simultaneous orientation, if the temperature is too low the stretching forces will tend to cause internal shredding and void splitting. This leads to a complete loss of control over the integrity of the individual closed voids and as a consequence, a deterioration in the integrity of the matrix polymer. Thus, one skilled in the art following the present general guidelines can orient at a temperature and to a degree which will yield Z and Y dimensions approaching a maximum without causing any substantial amount of splitting, shredding or overall lack of void and matrix integrity.

By way of illustration, room temperature biaxial orientation of a polypropylene matrix containing nylon spheres of the size and amount contemplated herein will not produce the structure constituting facing layer (a) herein. Either void splitting will occur or voids of insignificant size will result. Polypropylene must be oriented at a temperature which happens to be significantly higher than its glass transition temperature. The temperature conditions must permit X and Y to be at least several multiples of the Z dimension without causing any appreciable amount of void splitting. When this is accomplished, optimum physical characteristics including low water vapor transmission rates and a high degree of light scattering are obtained without significant void splitting or film fibrillating.

As indicated above, the matrix polymer and the void initiating particle contained therein must be mutually incompatible, which is to say, they must maintain two distinct phases under the conditions of biaxial orientation selected. The spherical void-initiating particles constitute a dispersed phase within the lower melting matrix polymer which polymer will, upon orientation, become a void-filled matrix with the spherical particles positioned somewhere within the voids.

It is believed that because of the comparative sphericity of the void-initiating particles, the voids are closed cells. This means that there is virtually no path open from one side of the substrate to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape. Even a polymeric material can be used as the void-initiating particle provided it is one which can be co-melted with the polymer of the matrix or substrate. In this case, it in necessary for it to have a sufficiently higher melting point than the substrate polymer and be incompatible and capable of assuming a dispersed phase of small spherical particles as the temperature of the co-melted mix is reduced. It is also contemplated that the void-initiating particles can be preformed and then uniformly dispersed into a melt, e.g., one of polypropylene. This has the advantage of not subjecting the matrix polymer to the temperature of a much higher melting polymer. In this manner, any thermal degradation of the matrix polymer is avoided.

It is believed that because of the number, shape and orientation strata-wise of the voids, a significantly enhanced light scattering effect is obtained. This effect is further enhanced or magnified by the use of the skin layer of the size relationship mentioned above. Skin layer (a)(ii) can optionally contain an opacifying pigment, e.g., titanium dioxide to further augment the degree of opacity of facing layer (a).

When preformed spheres are employed, it is the shape and size of the spheres that are important to the practice of this invention rather than their chemical composition. Solid or hollow organic or inorganic spheres of any type can be employed. Interesting effects can be achieved by the use of spheres of different colors. Since statistically each void has approximately one sphere somewhere within the void, interesting and pleasing color and/or reflectance effects can be imparted to the overall facing layer structure by the use of spheres of different color absorption or reflectance characteristics. The light scattered in a particular void is additionally either absorbed or reflected by the void-initiating sphere and a separate color contribution is made to the light scattering in each void.

Thermoplastic resins which can be employed as the dispersed phase within the matrix material include the polyamides or nylons of commerce, polyesters such as the polyethylene terephthalate acetals, acrylic resins, etc. Inorganic materials include solid or hollow preformed glass spheres, metal beads or spheres, ceramic spheres, etc. In fact, any material which can be formed into spheres but does not cause thermal degradation of the matrix material is within the scope of this invention.

Employing the polymer film structure of U.S. Pat. No. 4,377,616 as facing layer (a), light transmission through this layer can be reduced to as low as about 16 percent. This would be the case with a film having an overall thickness of at least 1.5 mils where the thickness of substrate layer (a)(i) of the overall product is at least 60 percent with the thickness of skin layer (a)(ii) and release layer (b) each contributing about 20 percent to the overall thickness.

While the preferred particle size of the sphere is to be from about 0.1 to about 10 microns, it is particularly preferred that the particle size range from about 0.75 to about 2 microns. The void-initiating particles can be present in up to about 20 percent by weight of the core layer prior to orientation, a preferred range being from about 2 to 7 percent by weight.

For convenience and more precise control of the formulation and character of substrate layer (a)(i), a master batch technique can be employed either in the case of forming the spherical particles in situ or in adding preformed spheres to the molten substrate matrix material. After the formation of a master batch, appropriate dilution of the batch can be accomplished by adding additional thermoplastic substrate matrix material until the desired proportions are obtained.

As previously stated, it is preferred that substrate layer (a)(i), skin layer (a)(ii) and release layer (b) be coextruded. Thereafter, biaxial orientation is carried out to an extent and at a temperature calculated to obtain the maximum degree of opacity without any significant sacrifice in the physical characteristics appearance of the film structure. As is evident, as the materials employed change, the conditions of biaxial orientation will change. By way of exemplification, when nylon-6 is used as the void-initiating spheres, a machine direction orientation of from 4 to 8 times and a transverse direction orientation of from about 4 to 8 times at a drawing temperature of from 100° C. to 160° C. yields a biaxially oriented pressure sensitive label stock product of from 0.7 to 3 mils overall thickness.

In the case where layer(a) is itself a laminate such as the opaque multilayer film described above, the polyolefin constituting the substrate film is admixed with pressure sensitive adhesive so that on coextrusion with the skin layer and subsequent orientation, adhesive will migrate only to the surfaces of the substrate layer. Such disproportionate concentration of pressure sensitive adhesive is thought to come about as a result of the orientation process which brings about crystallization of the matrix polymer accompanied by an exclusion of amorphous material (i.e., the pressure sensitive adhesive composition) from the crystalline areas of the matrix polymer, there being a tendency for such amorphous material to be driven or forced to the surfaces of the substrate layer. The pressure sensitive adhesive component generally comprises a normally non-tacky elastomer, e.g., natural and/or synthetic rubbers, butadiene-styrene rubbers, polyisobutylene rubbers, isopolybutadiene rubbers, ethylene-propylene terpolymer rubbers, polyacrylic rubbers, polyvinyl ether rubbers, butadiene-acrylonitrile rubbers, butadiene-styrene-acrylonitrile rubbers, butadiene-styrene-acrylonitrile rubbers, butyl rubbers, etc., in combination with a tacky or tackifying resin, e.g., a rosin ester, a hydrogenated rosin ester, the glycerol ester of hydrogenated rosin, a polyterpene resin, a coumaroneindene resin, crude rubber, a polyisobutylene or other unsaturated hydrocarbon resin, a phenolated terpene, a petroleum resin, etc. The pressure sensitive adhesive may also contain additives such as anti-oxidants, fillers, and the like.

Alternative to incorporating the pressure sensitive adhesive into substrate layer (a)(i) as described above, when facing layer (a) is a monolefin, following extrusion of this layer an organic solvent solution of the adhesive, e.g., in toluene, can be applied to its lower surface with subsequent drying.

The release agent can be incorporated directly into the polymer constituting release layer (b) prior to extrusion as it, too, will tend to concentrate at the surfaces of this layer following biaxial orientation. The amounts of release agent used can be within the ranges mentioned for the pressure sensitive adhesive. Like the latter, the release agent can also be applied to the surface of release layer (b) in a separate operation. The release agent can be selected from any of the materials known to have been used for their release properties for pressure-sensitive adhesives. Common types are silicones and modified silicones, the modification including both copolymerization or silicones with other non-release chemical agents or by adding non-silicone materials to a silicone coating solution prior to surface application of the release agent to the release layer. Other release agents such as polyethylene, fluorocarbon, the Werner type chromium complexes and polyvinyl octadecyl carbamate have also been used. The choice of the release coating is dependent on the tack and adhesion level of the adhesive contained in the adjacent substrate layer as is appreciated by those skilled in the art.

As a result of the biaxial orientation of combined facing layer (a) and release layer (b), physical properties of the composite layers such as flex-cracking resistance, Elmendorff tear strength, elongation, tensile strength, impact strength and cold strength properties are significantly increased.

The following examples are illustrative of the invention.

EXAMPLE 1

A mixture of isotactic polypropylene (83 parts, MP 160° C. and a melt index of 4.5), nylon-6 (7 parts, MP 225° C.) and a 1:2 weight part mixture of styrene-butadiene rubber and hydrogenated rosin derivative (10 parts) as a pressure sensitive adhesive is melted in a first extruder provided with a screw of L/D ratio of 20:1 to provide the substrate layer. A second extruder in association with the first extruder is supplied with the same polypropylenze but without the nylon-6 present to provide the skin layer and a third extruder in association with the first two extruders is supplied with the same polypropylene as the second extruder but containing a standard silicone release agent (10 parts) to provide the release layer. A melt coextrusion is carried out while maintaining the cylinder of the substrate material at a temperature ranging from 190° C. to 220° C. The polypropylene to be extruded as the skin layer and the release layer is maintained at a temperature of 220° C. A film structure is coextruded with a substrate thickness of 40% of the total extruded thickness. The skin layer and release layer each is approximately 30% of the total thickness. The unoriented film structure measures approximately 40 mils in thickness. This film structure is subsequently oriented seven by seven and one-half times using a commercially available sequential biaxial orientation apparatus causing void formation and opacification, solid state crystallization of the polypropylene and forcing the pressure sensitive adhesive and release agent to disproportionately concentrate at the surfaces of their respective layers. The MD orientation temperature is about 105° C. and the TD orientation 135° C. The resulting 1.9 mil coextruded pressure sensitive label stock has an opacity of 20% transmission and a 45° gloss of 120%. The combined substrate layer and skin layer, i.e., the facing layer, is readily peelable from the release layer and shows good surface adhesion.

EXAMPLE 2

Example 1 is substantially repeated except that a 35 weight percent solution of the pressure sensitive adhesive in toluene is coated upon the exposed surface of the substrate layer which has been coextruded with the skin layer. Following drying of the adhesive, the substrate layer/skin layer, i.e., the facing layer, is adhered to the separately extruded release layer and the combined layers are biaxially oriented as before to provide a pressure sensitive label stock product.

EXAMPLE 3

Example 2 is substantially repeated except that the silicone release agent is applied as a coating upon the separately extruded release layer.

EXAMPLES 4–5

Examples 1 and 2 are substantially repeated except that a second skin layer identical to the first is applied to the underside, or exposed, surface of the release layer.

EXAMPLE 6

A toluene solution of a 1:2 weight part mixture of styrene-butadiene rubber and hydrogenated rosin derivative (10 parts) as a pressure sensitive adhesive is applied to the lower surface of an isotactic polypropylene film of about 40 mils thickness containing titanium dioxide pigment as an opaquing agent. Following evaporation of the solvent, the adhesive-coated facing layer is applied to a second isotactic polypropylene film of 40 mils thickness in which there had been incorporated a standard release agent (10 parts). This laminate film structure is subsequently oriented seven by seven and one-half times using a commercially available sequential biaxial orientation apparatus causing solid state crystallization of the polypropylene and forcing the pressure sensitive adhesive and release agent to disproportionately concentrate at the surfaces of their respective layers. The facing layer is readily peelable from the release layer and shows good surface adhesion.

What is claimed is:

1. A biaxially oriented label stock product of which comprises:
    (a) a facing layer in the form of a polyolefin film having an upper surface and a lower surface, a pressure sensitive adhesive component incorporated within said facing layer or applied as a coating to the lower surface thereof; and,
    (b) a release layer in the form of a polyolefin film having an upper surface and a lower surface and having a release agent component for the pressure sensitive adhesive component of facing layer (a) incorporated therein or applied as a coating to the upper surface thereof, the lower surface of facing layer (a) being peelably affixed to the upper surface of said release layer (b).

2. The label stock product of claim 1 wherein facing layer (a) is a single layer of polyproplene film.

3. The label stock product of claim 1 wherein facing layer (a) is a laminate.

4. The label stock product of claim 3 wherein the laminate of facing layer (a) comprises:
    (i) a thermoplastic matrix substrate layer having an upper and lower surface, a pressure sensitive adhesive component incorporated within said substrate layer and a strata of voids located within said substrate layer;
    positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void; and,
    (ii) a void-free thermoplastic skin layer affixed to the upper surface of substrate layer (a) (i).

5. The label stock product of claim 4 wherein the void-initiating particle is an inorganic material.

6. The label stock product of claim 4 wherein the void-initiating particle is an organic material.

7. The label stock product of claim 4 wherein the void-initiating particle is a polymer.

8. The label stock product of claim 4 wherein a skin layer (c) is affixed to the exposed surface of release layer (b).

9. The label stock product of claim 4 wherein said product is a coextruded structure.

10. The label stock product of claim 8 wherein said product is a coextruded structure.

11. The label stock product of claim 4 wherein substrate layer (a)(i) and skin layer (a)(ii) are fabricated from the same resin.

12. The label stock product of claim 11 wherein the resin is isotactic polypropylene.

13. The label stock product of claim 4 wherein substrate layer (a)(i), skin layer (a)(ii) and release layer (b) are fabricated from the same resin.

14. The label stock product of claim 8 wherein substrate layer (a)(i), skin layer (a)(ii), release layer (b) and skin layer (c) are fabricated from the same resin.

15. The label stock product of claim 13 wherein the resin is polypropylene.

16. The label stock product of claim 14 wherein the resin is polypropylene.

17. The label stock product of claim 4 wherein the pressure sensitive adhesive is disproportionately concentrated at the surfaces of substrate layer (a)(i).

18. The label stock product of claim 4 wherein the release agent is disproportionately concentrated at the surfaces of release layer (b).

19. The label stock product of claim 8 wherein the pressure sensitive adhesive is disproportionately concentrated at the surface of substrate layer (a)(i) and the release agent is disproportionately concentrated at the surface of release layer (b).

20. The label stock product of claim 4 wherein the pressure sensitive adhesive is a combination of a natural or synthetic rubber and a tacky or tackifying resin and the release agent is a silicone or modified silicone.

* * * * *